(12) United States Patent
Takeuchi et al.

(10) Patent No.: US 7,252,907 B2
(45) Date of Patent: Aug. 7, 2007

(54) NONAQUEOUS ELECTROLYTE SECONDARY BATTERY

(75) Inventors: Masanobu Takeuchi, Kobe (JP); Seiji Yoshimura, Kobe (JP)

(73) Assignee: SANYO Electric Co., Ltd., Osaka (JP)

( * ) Notice: Subject to any disclaimer, the term of this patent is extended or adjusted under 35 U.S.C. 154(b) by 303 days.

(21) Appl. No.: 10/786,593

(22) Filed: Feb. 26, 2004

(65) Prior Publication Data

US 2004/0170895 A1  Sep. 2, 2004

(30) Foreign Application Priority Data

Feb. 27, 2003 (JP) ............... 2003-050319

(51) Int. Cl.
*H01M 4/80* (2006.01)
*H01M 4/58* (2006.01)
*H01M 4/66* (2006.01)

(52) U.S. Cl. ............... 429/235; 429/218.1; 429/236; 429/237; 429/245

(58) Field of Classification Search ............ 429/218.1, 429/245, 236, 237, 235
See application file for complete search history.

(56) References Cited

U.S. PATENT DOCUMENTS

| | | | |
|---|---|---|---|
| 5,360,685 A | | 11/1994 | Tanaka ................ 429/185 |
| 5,506,016 A | * | 4/1996 | Onodera et al. ........... 428/40.9 |
| 5,738,907 A | * | 4/1998 | Vaccaro et al. ............ 427/172 |

FOREIGN PATENT DOCUMENTS

| | | | |
|---|---|---|---|
| JP | 10-223220 | * | 8/1998 |
| JP | 10-302739 A | | 11/1998 |
| JP | 11-233116 A | | 8/1999 |

\* cited by examiner

*Primary Examiner*—Jill Warden
*Assistant Examiner*—Thomas H. Parsons
(74) *Attorney, Agent, or Firm*—Kubovcik & Kubovcik

(57) ABSTRACT

A nonaqueous electrolyte secondary battery including positive and negative electrodes capable of occluding and releasing lithium and a nonaqueous electrolyte and in which the negative electrode includes a foamed metal containing silicon as an active material therein.

13 Claims, 1 Drawing Sheet

NONAQUEOUS ELECTROLYTE SECONDARY BATTERY

FIELD OF THE INVENTION

The present invention relates to a nonaqueous electrolyte secondary battery, for example, a lithium secondary battery.

BACKGROUND OF THE INVENTION

Portable equipment has recently had greater power requirements. These requirements have created a demand for batteries having higher energy density. Silicon is attractive as an active material for a negative electrode for a nonaqueous electrolyte secondary battery because it forms an alloy with lithium and has a high charge and discharge capacity, i.e., 4,100 mAh/g. Japanese Patent Laid-open Publication No. 10-223220 discloses a nonaqueous electrolyte battery using silicon particles as an active material of a negative electrode.

OBJECT OF THE INVENTION

However, silicon has poor charge and discharge characteristics because its electrical conductivity is small due to silicon itself being a semiconductor. When silicon is used as an active material, the active material dramatically expands and contracts during charge and discharge. Therefore, when charge and discharge cycles are repeated, there is a problem that the active material separates from the electrode.

An object of the present invention is to provide a nonaqueous electrolyte secondary battery that uses silicon as an active material for a negative electrode and has high capacity and excellent charge discharge load characteristics and cycle characteristics.

SUMMARY OF THE INVENTION

The present invention relates to a nonaqueous electrolyte secondary battery comprising positive and negative electrodes capable of occluding and releasing lithium and a nonaqueous electrolyte and in which the negative electrode comprises a foamed metal containing silicon therein as an active material.

EXPLANATION OF ELEMENTS

Figure 1:
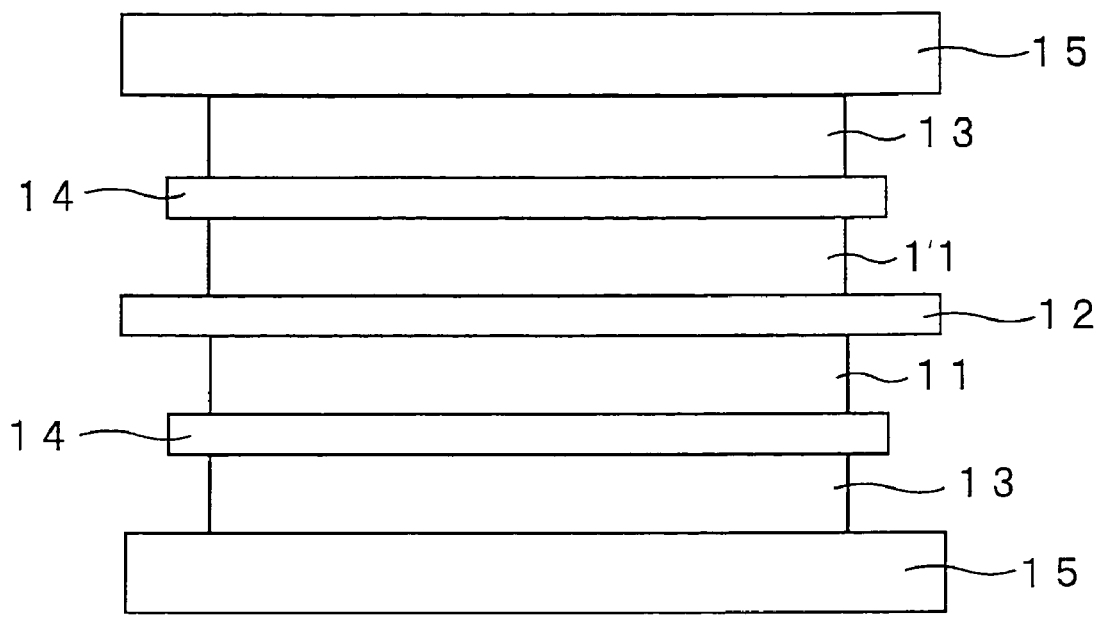
FIG. 1 is a cross section showing the structure of an electrode prepared in the Examples.

1: foamed metal
2: positive electrode plate
3: separator
4: negative electrode can
5: positive electrode can
4: insulation packing
11: foamed metal
12: metal current collector
13: separator
14: separator
15: glass plate

DETAILED EXPLANATION OF THE INVENTION

The negative electrode of the present invention contains silicon, as the active material, within the pores of the foamed metal. Contact area between the silicon and the metal is large because silicon is held in the foam of the foamed metal and a high electrical-conductivity can be provided to the silicon to improve charge and discharge characteristics.

The foamed metal used in the present invention can be prepared by slurry foaming, sintering, plating, pressure casting (founding), and the like.

Slurry foaming is a method of preparing a slurry of a metal powder, a binder and a plasticizer, adding a foaming agent to the slurry, fabricating a plate and foaming the slurry to form a porous material after dry sintering.

Sintering is a method of fabricating metal particles and/or metal fabric, and sintering to form a porous material.

Plating is a method of plating various metals on a body of a porous polymer material, and then sintering the plated polymer to remove the polymer and to prepare a porous material.

Pressure casting (founding) is a method of pressure casting a molten metal into spaces between particles filled in a mold to prepare a porous material.

There are no limitations with respect to the metal used for the foamed metal if the metal has good electrical conductivity and is capable of forming a foamed metal. A foamed metal comprising copper or nickel is preferably used. For example, a foamed metal conventionally used as an electrically conductive current collector for a nickel electrode for a nickel-cadmium storage battery and a nickel-hydrogen storage battery can be used.

A foamed metal containing silicon therein in the present invention can be prepared by coating or impregnating the foamed metal with a slurry containing silicon particles and a binder. As the average particle diameter of the silicon, an average particle diameter of not greater than 10 μm is preferred, and an average particle diameter of not greater than 3 μm is more preferred. As the binder, a binder conventionally used for an electrode of a nonaqueous electrolyte secondary battery can be used. When the foamed metal is to be sintered after immersing or coating of the slurry, a binder having an excellent heat-resistance is preferred. For example, a polyimide binder can preferably be used.

In an electrode plate prepared by pressure rolling the foamed metal containing silicon, a volume of silicon particles of not more than 25% and a volume of pores of not more than 75%, relative to the total volume of silicon particles, binder and pores, are preferred.

Regarding the impregnation of the foamed metal with the slurry, the foamed metal can be dipped into the slurry or the like. After impregnating or coating the foamed metal with the slurry, the foamed metal is dried to prepare the foamed metal containing silicon. It is preferred to sinter the impregnated or coated foamed metal after drying. When a polyimide binder is used, a preferred sintering temperature is in the range of 250~600° C. It is also preferable to roll the foamed metal containing the silicon through a pressure roller. Contact between the silicon and metal in the foamed metal can be improved by rolling to improve charge and discharge load and cycle characteristics.

The negative electrode of the present invention preferably comprises the foamed metal containing silicon and a metal current collector. The foamed metal is preferably in contact with a surface (or both surfaces) of the metal current collector. When the foamed metal is in contact with the metal current collector, current conductivity can be improved and charge discharge load and cycle characteristics can be further improved. There is a possibility that electrical conductivity of the foamed metal may be deteriorated when a part of the foamed metal is damaged by volumetric expansion and shrinkage of silicon during charge and discharge reactions. If the foamed metal and the metal current collector are adjacent to each other, deterioration of electrical conductivity can be prevented.

As a method for contacting the foamed metal and the metal current collector with each other, welding or an adhesive agent can be illustrated for adhering the foamed metal and the metal current collector. It is also possible to house the foamed metal and the metal current collector in a battery can and have them contact each other by structural pressure created by assembling of the battery. Other methods are also applicable to have the foamed metal and the metal current collector contact each other.

When the battery is prepared by winding or layering of the positive electrode, the negative electrode and a separator, it is preferred to use a copper foil having a thickness of 8~25 µm as a metal current collector. If it is possible to directly contact almost the entire side of the negative electrode on a negative electrode outer can, it is preferred that the negative electrode outer can be used as the metal current collector.

There are no limitations with respect to an active material for the positive electrode if the material is capable of occluding and releasing lithium. Materials conventionally used as an active material for a positive electrode in a lithium secondary battery can be used. For example, a lithium transition metal oxide comprising at least a transition metal, for example, cobalt, nickel, manganese, and the like, can be illustrated.

As the solvent for the nonaqueous electrolyte in the battery of the present invention, a solvent conventionally used as a solvent for an electrolyte of a lithium secondary battery can be used. Among such solvents, a mixed solvent of a cyclic carbonate and a chain carbonate is preferred. As cyclic carbonates, ethylene carbonate, propylene carbonate, butylene carbonate, vinylene carbonate, and the like, can be illustrated. As chain carbonates, dimethyl carbonate, methylethyl carbonate, diethyl carbonate, and the like, can be illustrated. The ratio in a mixture of the cyclic carbonate and the chain carbonate is in the range of 5:5~2:8 (cyclic carbonate:chain carbonate) by volume.

As the solute of the nonaqueous electrolyte in the present invention, a lithium salt conventionally used as a solute for a lithium secondary battery can be used. $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and the like, can be used alone or in various combinations thereof.

DESCRIPTION OF PREFERRED EMBODIMENTS

Embodiments of the present invention are explained in detail below. It is of course understood that the present invention is not limited to these embodiments and can be modified within the spirit and scope of the appended claims.

EXAMPLE 1

[Preparation of Positive Electrode Plate]

Lithium cobalt oxide ($LiCoO_2$), a carbon material (a mixture of acetylene black having a specific surface area of 70 $m^2$/g and artificial graphite having a specific surface area of 300 $m^2$/g in a ratio of 3:2) as an electrically conductive agent, and polyfluorovinylidene as a binder were mixed in a ratio of 92:5:3 by weight in N-methylpyrrolidone (NMP) to prepare a positive electrode mixture slurry. The slurry was coated on one side of an aluminum foil, and was rolled after drying to prepare a positive electrode plate.

[Preparation of Foamed Metal Containing Active Material]

A foamed metal made of nickel by a plating method was used. The porosity of the foamed metal was 98% and the surface area was 7,500 $m^2/m^3$. Silicon particles (average diameter of 1 µm) and a polyimide binder were mixed in a ratio of 80:20 by weight in NMP solution to prepare a negative electrode slurry. The foamed metal was dipped in the slurry to impregnate the slurry into the foamed metal. The impregnated foamed metal was removed from the slurry, and sintered at 400° C. after drying. The foamed metal having a thickness of 1.25 mm was rolled by a pressure roll to decrease the thickness to 125 µm.

[Preparation of Electrolyte]

Lithium hexafluorophosphate ($LiPF_6$) as a solute was dissolved in a mixed solvent (1:1) of ethylene carbonate and diethyl carbonate to provide a $LiPF_6$ concentration of 1 mol/l and to prepare the electrolyte.

[Assembly of Battery]

The above-prepared foamed metal containing silicon therein, the positive electrode plate and the electrolyte were used to prepare a lithium secondary battery for a test.

As shown in FIG. 1, glass plate 15, positive electrode plate 13 separator 14, foamed metal 11, copper foil 12 as a metal current collector, foamed metal 11, separator 14, positive electrode plate 13 and glass plate 15 were layered in this order, secured by a binder (clip) and then were placed in a glass cell. The electrolyte was poured into the cell. A battery having a facing area of the positive and negative electrodes of 5 $cm^2$, a capacity ratio of the positive electrode and negative electrode of 1.15, and a designed capacity of 200 mAh was prepared.

EXAMPLE 2

A battery was prepared in the same manner as the battery of Example 1 except that a foamed metal comprising copper was used instead of the foamed metal comprising nickel. The foamed metal comprising copper was prepared by a slurry foaming method, and had a porosity of 94% and a surface area of 15,000 $m^2/m^3$.

EXAMPLE 3

A battery was prepared in the same manner as the battery of Example 1 except that the battery was assembled in a combination of glass plate 15, positive electrode plate 13, separator 14, foamed metal 11, foamed metal 11, separator 14, positive electrode plate 13 and glass plate 15 in this order.

Comparative Example 1

The negative electrode slurry of Example 1 was coated on both surfaces of the copper foil so as to be the same amount of slurry as impregnated in the foamed metal in Example 1, and was rolled after drying to prepare a negative electrode plate. A battery was prepared in the same manner as the battery of Example 1 except that a layered material of glass plate, positive electrode plate, separator, negative electrode plate, separator, positive electrode plate and glass plate in this order was used.

EXAMPLE 4

The same foamed metal in Example 1 was prepared and the foamed metal was welded on both surfaces of the copper foil of the metal current collector by spot welding.

Figure 2:
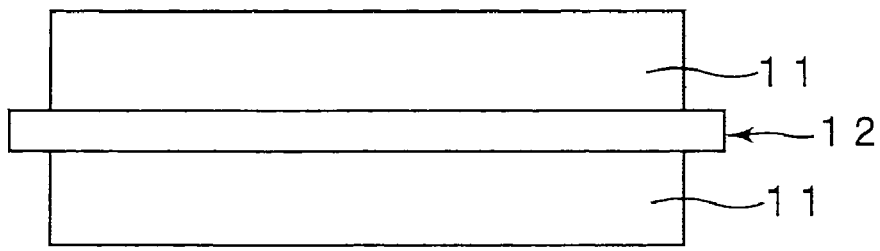
FIG. 2 is a cross-section of another example of the present invention showing a combination of a foamed metal and a metal current collector.

FIG. 2 shows that the foamed metal 11 was placed on both sides of the metal current collector 12 by spot welding. The separators, positive electrode plates and glass plates were layered on both sides to prepare a battery in the same manner as Example 1.

EXAMPLE 5

The negative electrode slurry prepared in Example 1 was impregnated into the foamed metal, and a copper foil was inserted between the two foamed metals, and the combination was sintered at 400° C., and rolled to prepare a negative electrode plate. The foamed metal containing silicon therein was physically secured on both sides of surface of the copper foil. Using this negative electrode plate, a glass plate, positive electrode plate, separator, negative electrode plate, separator, positive electrode plate and glass plate were layered in this order to prepare a battery in the same manner as Example 1.

EXAMPLE 6

[Preparation of Positive Electrode]

Lithium cobalt oxide ($LiCoO_2$), carbon material (a mixture of acetylene black having a specific surface area of 70 $m^2/g$ and artificial graphite having a specific surface area of 300 $m^2/g$ in a ratio of 3:2) as an electrically conductive agent and polyfluorovinylidene as a binder were mixed in a ratio of 85:10:5 by weight, and fabricated with pressure into a disc to prepare a positive electrode plate.

[Preparation of Foamed Metal Containing Active Material]

The negative electrode material slurry of Example 1 was impregnated into the foamed metal in the same manner as Example 1. The impregnated foamed metal was placed on a negative electrode can, sintered at 400° C. after drying, and was rolled by a pressure roll until the thickness became 125 μm. A negative electrode plate in which the foamed metal containing silicon was secured in contact with the negative electrode can was obtained.

[Assembly of Battery]

A coin shaped battery was assembled using the positive electrode plate and negative electrode plate prepared above.

Figure 3:
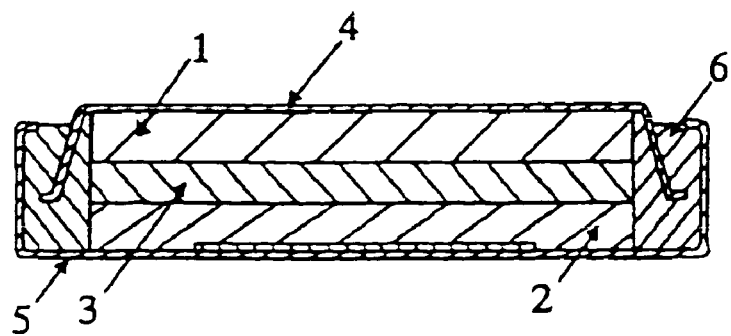
FIG. 3 is a cross-section of a battery prepared in another example.

FIG. 3 is a cross section of the coin shaped battery prepared above. As shown in FIG. 3, the lithium secondary battery comprised the negative electrode plate comprising foamed metal 1 and negative electrode can 4, positive electrode plate 2, separator 3, positive electrode can 5 and insulation packing 6. The foamed metal 1 was united with the negative electrode by rolling to form the negative electrode plate. Insulation packing 6 made of polyether ether ketone was used. A lithium secondary battery having a facing area of the positive and negative electrodes of 5 $cm^2$, capacity ratio of the positive electrode and negative electrode of 1.15, and a designed capacity of 200 mAh was prepared.

(Charge and Discharge Test)

The batteries of Examples 1~6 and Comparative Example 1 were subjected to a charge and discharge test. Conditions of charge and discharge were as follows:

Charge: 0.05C, constant current charge, 4.2V cutoff
Discharge: 0.05C, constant current discharge, 2.75V cutoff Discharge capacity shown in the second column of Table 1 is the capacity of each battery at the first cycle. Initial Efficiency is: (discharge capacity at the first cycle)/(charge capacity at the first cycle). Remaining capacity after ten cycles is discharge capacity at tenth cycle. The results for each battery of discharge capacity, initial efficiency and remaining capacity after ten cycles are shown in Table 1.

TABLE 1

| | Discharge Capacity (mAh) | Initial Efficiency (%) | Remaining Capacity After 10 Cycles (mAh) |
|---|---|---|---|
| Example 1 | 170 | 83 | 85 |
| Example 2 | 179 | 87 | 100 |
| Example 3 | 77 | 57 | 0.8 |
| Example 4 | 175 | 85 | 110 |
| Example 5 | 180 | 90 | 145 |
| Example 6 | 180 | 90 | 160 |
| Comparative Example 1 | 0.4 | 30 | 0 |

As shown in Table 1, the batteries of Examples 1~6 have better results of discharge capacity, initial efficiency and remaining capacity after ten cycles as compared to Comparative Example 1 in which the conventional negative electrode plate was used. Therefore, the present invention can provide a lithium secondary battery having high discharge capacity and charge and discharge load characteristics and cycle characteristics.

As is clear from a comparison of Example 3 with the other examples, when the metal current collector was adjacent to the foamed metal, current collectability was improved to obtain excellent cycle characteristics.

Advantages of the Invention

According to the present invention, a nonaqueous electrolyte secondary battery having a high capacity and excellent charge and discharge load characteristics and cycle characteristics can be provided.

What is claimed is:

1. A nonaqueous electrolyte secondary battery comprising a positive electrode and a negative electrode capable of occluding and releasing lithium and a nonaqueous electrolyte, wherein the negative electrode comprises a sintered product of a foamed metal containing silicon therein as an active material and polyimide as a heat resistant binder.

2. The nonaqueous electrolyte secondary battery according to claim 1, wherein the foamed metal comprises copper or nickel.

3. The nonagneous electrolyte secondary battery according to claim 2, wherein the foamed metal containing silicon therein is prepared by impregnation or coating of a foamed metal with a slurry comprising silicon particles and a binder.

4. The nonagteous electrolyte secondary battery according to claim 3, wherein the negative electrode comprises the foamed metal and a metal current collector, and the foamed metal is adjacent to a side or both sides of the metal current collector.

5. The nonagneous electrolyte secondary battery according to claim 4, wherein the foamed metal and the metal current collector are secured together by welding or an adhesive agent, or are held adjacent to each other by structural pressure of the battery.

6. The nonaqueous electrolyte secondary battery according to claim 2, wherein the negative electrode comprises the foamed metal and a metal current collector, and the foamed metal is adjacent to a side or both sides of the metal current collector.

7. The nonaqueous electrolyte secondary battery according to claim 6, wherein the foamed metal and the metal current collector are secured together by welding or an adhesive agent, or are held adjacent to each other by structural pressure of the battery.

8. The nonaqusous electrolyte setondary battery according to claim 1, wherein the foamed metal containing silicon therein is prepared by impregnation or coating of a foamed metal with a slurry comprising silicon particles and a binder.

9. The nonaqueous electrolyte secondary battery according to claim 8, wherein the negative electrode comprises the foamed metal and a metal current collector, and the foamed metal is adjacent to a side or both sides of the metal current collector.

10. The nonaquecus electrolyte secondary battery according to claim 9, wherein the foamed metal and the metal current collector are secured together by welding or an adhesive agent, or are held adjacent to each other by structural pressure of the battery.

11. The nonaqueous electrolyte secondary battery according to claim 1, wherein the negative electrode comprises the foamed metal arid a metal current collector, and the foamed metal is adjacent to a side or both sides of the metal current collector.

12. The nonaqueous electrolyte secondary battery according to claim 11, wherein the foamed metal and the metal current collector are secured together by welding or an adhesive agent, or are held adjacent to each other by structural pressure of the battery.

13. The nonaqueous electrolyte secondary battery according to claim 1, wherein the foamed metal containing the active material and the binder are sintered at a temperature in the range of 250~600° C.

* * * * *